T. C. McEWEN.
VEHICLE WHEEL TIRE.
APPLICATION FILED JAN. 31, 1919.
1,322,321.
Patented Nov. 18, 1919.
2 SHEETS—SHEET 1.
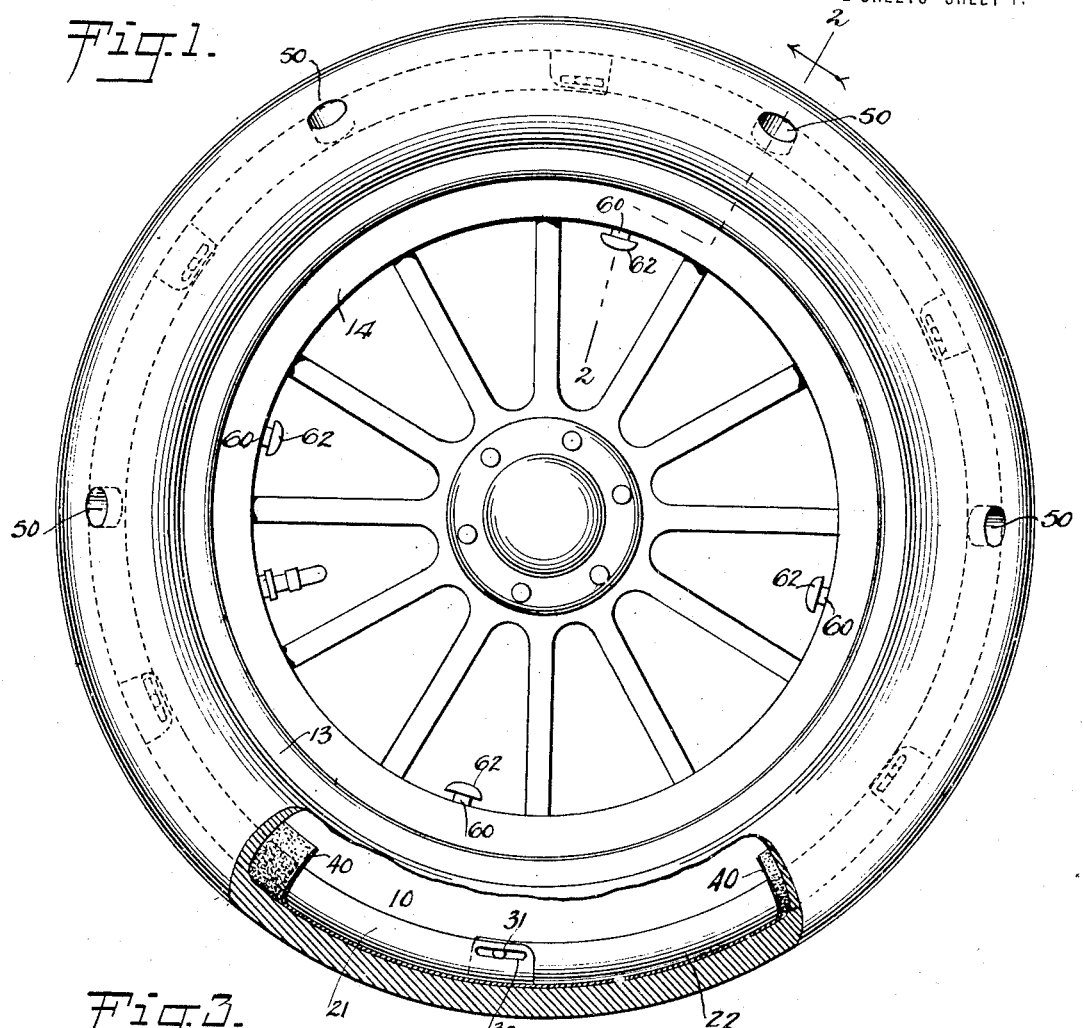
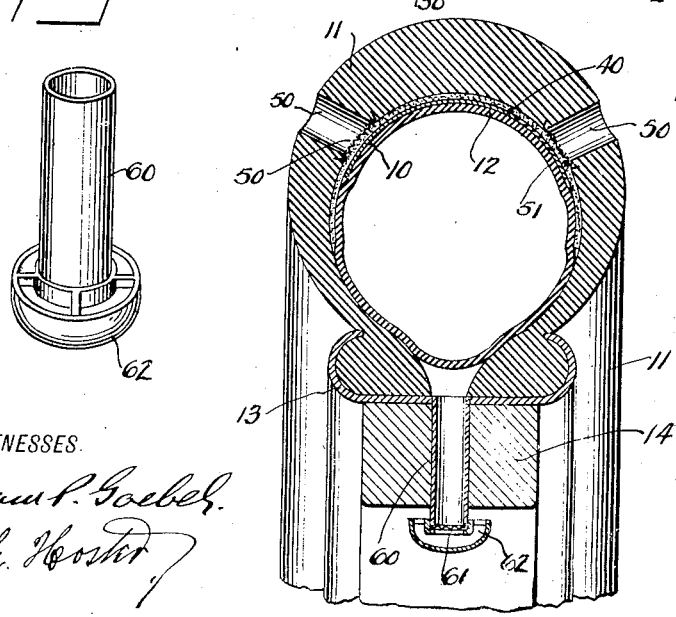
WITNESSES
William P. Goebel
Geo. J. Hosler
INVENTOR
THOMAS C. McEWEN
BY Munn & Co
ATTORNEYS T. C. McEWEN.
VEHICLE WHEEL TIRE.
APPLICATION FILED JAN. 31, 1919.
1,322,321.
Patented Nov. 18, 1919.
2 SHEETS—SHEET 2.
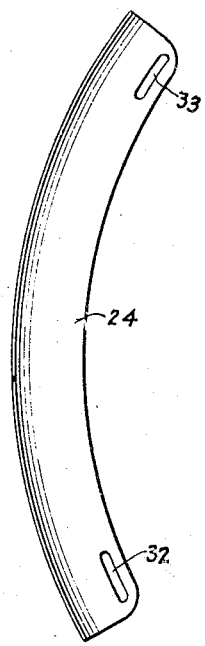
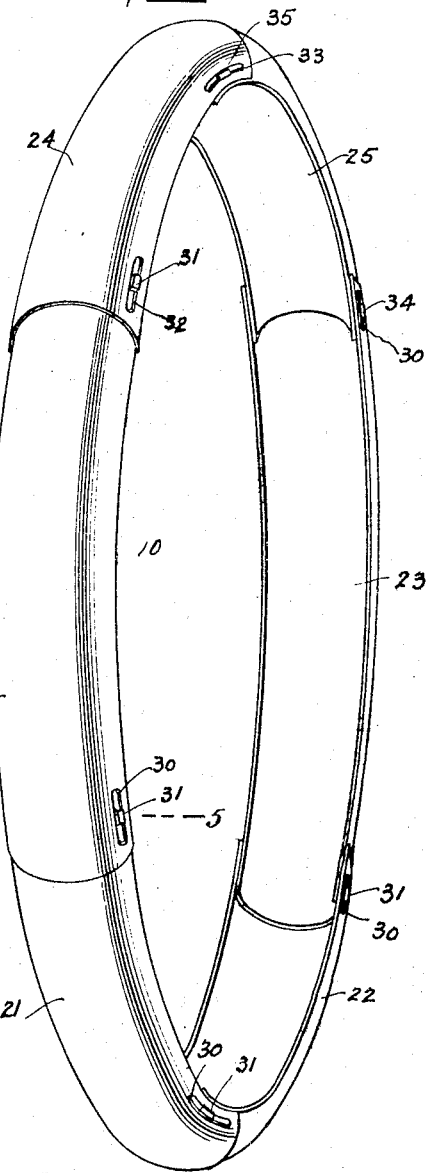
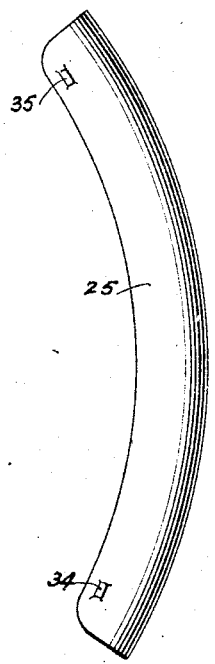
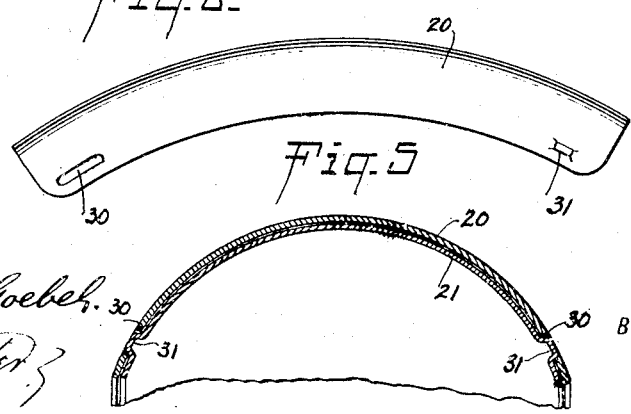
WITNESSES
INVENTOR
THOMAS C. McEWEN.
BY
ATTORNEYS

UNITED STATES PATENT OFFICE.

THOMAS C. McEWEN, OF BELLEVILLE, NEW JERSEY.

VEHICLE-WHEEL TIRE.

1,322,321.  Specification of Letters Patent.   Patented Nov. 18, 1919.

Application filed January 31, 1919. Serial No. 274,308.

*To all whom it may concern:*

Be it known that I, THOMAS C. MCEWEN, a citizen of the United States, and a resident of Belleville, in the county of Essex and State of New Jersey, have invented a new and Improved Vehicle-Wheel Tire, of which the following is a full, clear, and exact description.

The invention relates to tires having an outer shoe or a casing and an inflatable inner tube, and its object is to provide a new and improved vehicle wheel tire provided with an armor interposed between the shoe and the inner tube to protect the latter against punctures, blow-outs and other injuries. Another object is to permit of conveniently and quickly placing the armor in position in the tire for use thereof or removing the armor from the tire whenever it is desired to change the shoe or the inner tube for any reason whatever. Another object is to render the armor exceedingly useful in tires which have been in service for some time or in an otherwise useless tire. Another object is to provide an exceedingly cheap armor not liable to get easily out of order and which does not materially interfere with the resiliency or cushioning effect of the tire.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of a vehicle wheel provided with the improved tire;

Fig. 2 is an enlarged cross section of the same on the line 2—2 of Fig. 1;

Fig. 3 is a perspective view of one of the air circulating tubes for engaging the inner tube;

Fig. 4 is a perspective view of the armor;

Fig. 5 is an enlarged cross section of the same on the line 5—5 of Fig. 4; and Figs. 6, 7 and 8 are side elevations of sundry of the armor sections.

The armor 10 is more especially designed for use on a tire having the usual protecting casing or shoe 11 and an inner inflatable tube 12, the casing or shoe being held in position on the usual rim 13 attached to the felly 14 of the wheel, as plainly shown in Figs. 1 and 2. The armor 10 is interposed between the shoe 11 and the inner tube 12 and comprises a number of sections, preferably six in number, and made of thin sheet metal arched in a transverse direction to conform to the tread portion of the casing or shoe 11 and the inner tube 12.

The sections 20, 21, 22 and 23 of the armor are alike in construction while the sections 24 and 25 are differently constructed, as will be readily understood by reference to Figs. 4, 6, 7 and 8. The sections 20, 21, 22, 23, 24 and 25 have their ends arranged in overlapping relation, as plainly shown in Fig. 4, and each of the sections 20, 21, 22 and 23 is provided at the sides near one end with slots 30 extending circumferentially, and the sides at the other end of each section are provided with lugs 31, of which the lugs 31 of the section 21 slidingly engage the slots 30 of the section 20, the lugs 31 of the section 22 engage the slots 30 of the section 21, and the lugs 31 of the section 23 engage the slots 30 of the section 22. The ends of the section 24 are provided at the sides with slots 32 and 33 while the ends of the section 25 are provided at the sides with lugs 34, 35, of which the lugs 34 engage the slots 30 of the section 23, the lugs 35 engage the slots 33 of the section 24, and the lugs 31 of the section 20 engage the slots 32. The lugs 31, 34 and 35 are preferably struck up in the corresponding sections, as plainly indicated in Fig. 5, and the lugs engaging the slots allow the sections to slide one upon the other in a circumferential direction, the sliding movement being, however, limited by the length of the slots. It will also be noticed that by this arrangement the armor readily fits tires varying somewhat in diameter. It will further be noticed that the lugs engaging the slots hold the sections against turning in a transverse direction one on the other thus maintaining the sections in proper position between the shoe and the inner tube to effectively protect the inner tube from being punctured or otherwise injured. By making the sections 24 and 25 different from the remaining sections 20, 21, 22 and 23 the armor sections can be readily assembled in the shoe owing to the section 24 overlapping at both ends the corresponding ends of the sections 20 and 25. In practice, the section 24 is first placed into the casing or shoe 11 and then the sections 20, 21, 22, 23, 25 are successively placed in position, it being understood that the ends with the slots are outermost and the ends with the lugs are pressed into the slotted ends to connect the sections with each other in the shoe. Thus the lug ends of the last section 25 to be put in position can be readily pressed into position in the slotted ends of the sections 23 and 24 already in place in the shoe to complete the armor. It is understood that the ends of the sides of the sections readily yield owing to the resiliency of the metal of which the sections are made to allow of readily pressing a lug end of a section into the slotted end of the preceding section and to engage the lugs with the corresponding slots.

It will be noticed that when the armor is in position the outer portion of the inner tube 12 is practically completely incased in the metallic armor and consequently such inner tube is not liable to be punctured. The armor can be readily used on new tires but is especially intended to be used after the casing or shoe 11 has been somewhat worn out and fails to form a protector for the inner tube 12. When such casing or shoe is nearly worn out and the armor is applied then the tire is practically good for many thousands of miles to be run without requiring a new shoe or casing and at the same time rendering the inner tube 12 puncture proof.

In order to prevent overheating of the inner tube 12 by the metallic armor 10 use is made of a lining 40, preferably of asbestos or a similar material, interposed between the armor and the shoe or casing 11. As shown in Fig. 2, the sides of the lining 40 are preferably projected beyond the side edges of the armor.

In order to cool the metallic armor in case it becomes hot, use is made of airholes 50 formed in the shoe or casing 11 adjacent the sides of the armor 10, as plainly indicated in Figs. 1 and 2, to allow circulation of air and thereby cool the metallic armor. The inner ends of the openings 50 are preferably provided with screens 51 to prevent sand and other extraneous matter from passing into the shoe.

In order to prevent the inner tube 12 from overheating, use is made of tubes 60 extending through the felly 14 and its rim 13 and opening into the shoe between the inner ends thereof so that air can circulate through each tube 60 into the shoe to cool the inner tube 12. The outer end of each tube 60 is provided with a screen 61 to prevent sand or other extraneous matter from passing into the shoe by way of the tube 60, and the outer end of the tube 60 is also provided with a protecting hood 62 to deflect water or other extraneous matter from the outer end of the tube.

Having thus described my invention, I claim as new and desire to secure by Letters Patent:—

1. In a vehicle wheel tire, a felly, an outer shoe, an inner inflatable tube, and a plurality of air circulating spaced tubes attached to the felly and passing through the same, the said tubes opening between the spaced inner ends of the shoe for air to circulate through the tubes into the shoe to cool the said inner inflatable tube.

2. In a vehicle wheel tire, an outer shoe provided with screen covered openings, an inner inflatable tube, and an armor interposed between the said shoe and tube, the said armor extending over the inner ends of the said outer shoe openings.

3. In a vehicle wheel tire, a felly, and outer shoe, an inner inflatable tube, and a plurality of air circulating spaced tubes attached to the felly and passing through the same, the said tubes opening between the spaced inner ends of the shoe for air to circulate through the tubes into the shoe to cool the said inner inflatable tube, the outer end of each of the said tubes having a dust excluding head.

4. In a vehicle wheel, a felly, a shoe, an inner inflatable tube in the said shoe, an armor interposed between the said shoe and tube, and an air circulating tube extending through the said felly and opening into the said shoe, the outer end of the said tube having a dust excluding head.

THOMAS C. McEWEN.